United States Patent [19]
Sakamoto et al.

[11] Patent Number: 4,732,799
[45] Date of Patent: Mar. 22, 1988

[54] POLYETHYLENE NAPHTHALATE FILM

[75] Inventors: Seiji Sakamoto, Machida; Yoshinori Sato, Yokohama, both of Japan

[73] Assignee: Diafoil Company, Limited, Tokyo, Japan

[21] Appl. No.: 930,113

[22] Filed: Nov. 13, 1986

[30] Foreign Application Priority Data

Nov. 13, 1985 [JP] Japan .................. 60-254316

[51] Int. Cl.$^4$ .............................. G11B 5/704
[52] U.S. Cl. ........................... 428/141; 427/128; 428/480; 428/694; 428/900; 428/910
[58] Field of Search ........... 428/141, 694, 900, 480, 428/910; 427/128

[56] References Cited

U.S. PATENT DOCUMENTS

| | | | |
|---|---|---|---|
| 3,683,060 | 8/1972 | Tanabe et al. ............... | 264/289 |
| 4,198,458 | 4/1980 | Mitsuishi et al. ............ | 428/900 |
| 4,571,361 | 2/1986 | Kawaguchi et al. ......... | 428/328 |
| 4,619,855 | 10/1986 | Okita et al. ................. | 428/900 |
| 4,619,869 | 10/1986 | Kiriyama et al. ............ | 427/128 |

FOREIGN PATENT DOCUMENTS 1476407  8/1974  United Kingdom .

*Primary Examiner*—Paul J. Thibodeau
*Attorney, Agent, or Firm*—Oblon, Fisher, Spivak, McClelland & Maier

[57] ABSTRACT

Disclosed herein is a biaxially oriented polyethylene naphthalate film having a center line average roughness [Ra($\mu$m)] and a film thickness [T($\mu$m)] which satisfy the following formula:

$$\frac{0.015}{T^{0.2}} \leq Ra \leq \frac{0.08}{T^{0.2}}$$

produced by the electrostatic cooling method from polymethylene naphthalate having a resistivity of $1 \times 10^7$ to $5 \times 10^8$ $\Omega$.cm as measured in the molten state.

14 Claims, No Drawings

POLYETHYLENE NAPHTHALATE FILM

BACKGROUND OF THE INVENTION

The present invention relates to a polyethylene naphthalate film suitable for the base of magnetic recording medium which is superior in heat resistance, mechanical properties, film flatness, and handling qualities. More particularly, the present invention relates to a biaxially oriented polyethylene naphthalate film produced by the electrostatic cooling method from polyethylene naphthalate having a resistivity of $1 \times 10^7$ to $5 \times 10^8$ Ω.cm as measured in the molten state, said film having a center line average roughness Ra ($\mu$m) and a film thickness T ($\mu$m) which satisfy the following formula.

$$\frac{0.015}{T^{0.2}} \leq Ra \leq \frac{0.08}{T^{0.2}}$$

One of the major films in industrial use at present is polyethylene terephthalate film. The polyethylene terephthalate film is utilized to the widespread use because of its outstanding thermal property, mechanical property, chemical resistance, and weather resistance.

Ordinarily, the magnetic recording medium is produced by forming a magnetic layer on the surface of the base film according to a coating method or a vacuum evaporation method.

The magnetic recording medium is used as a base material of a magnetic tape or magnetic disc of an audio apparatus, a video and a computer memory. In the case of forming the magnetic layer on the base film by the coating method, a dispersion containing magnetic particles composed of γ-iron oxide, γ-iron oxide coated with cobalt, chromium dioxide and iron, a binder resin, a dispersing agent, an abrasives, an electrification preventing agent, a lubricant, a hardening agent, etc. is coated on the surface of the base film and after being subjected to magnetic orientation treatment, the thus obtained magnetic tape is dried.

Also, in the case of the vacuum evaporation method, a magnetic thin layer of cobalt-nickel alloy is formed by using a continuous vacuum evaporation machine.

Polyethylene terephthalate film is now indispensable for the base material of magnetic recording medium on account of its high strength, high Young's modulus, and excellent dimensional stability as compared with other films.

Recently, the magnetic recording medium is being improved very rapidly and the requirements for the base film has been made more vigorous. In the field of video recording, for example, equipments are being miniaturized and lightened weight. This movement requires the development of an 8-mm wide base film in addition to the conventional 0.5-inch wide base film.

The new base film for magnetic recording medium is required to thin and to increase mechanical strength. However, such requirements cannot be met with the conventional biaxially oriented polyethylene terephthalate film produced from polyethylene terephthalate by the sequential biaxial orientation in the longitudinal and transverse directions. The polyethylene terephthalate film has usually a Young's modulus of 400 to 600 kg/mm² which is lower than the desired level. Film obtained by the so-called re-orientation method has an improved Young's modulus of 600 to 900 kg/mm² and also improved mechanical properties, but it is so poor in dimensional stability at high temperatures and accordingly the obtained film is of no practical use.

Recently, biaxially oriented film of polyethylene naphthalate has become generally known. The biaxially oriented polyethylene naphthalate film is superior in Young's modulus and dimensional stability at high temperatures to polyethylene terephthalate film. Using polyethylene naphthalate film as the base film for magnetic recording medium is described in, for example, Japanese Patent Publication Nos. 48-29541 (1973) and 56-19012 (1981) and Japanese Patent Laying-Open (KOKAI) No. 50-45877 (1975).

It is generally known that polyethylene naphthalate film has good mechanical properties and dimensional stability at high temperatures. It is difficult to put the polyethylene naphthalate film to practical use, because it is poor in film flatness and handling qualities, especially in the case of thin one, if it is produced by the known process. It is apparent that polyethylene naphthalate film will be of great industrial value if these disadvantages are overcome.

With the foregoing in mind, as a result of the present inventors' extensive studies on polyethylene naphthalate film, it has been found that polyethylene naphthalate film is highly improved in film flatness and handling qualities if it is produced by the electrostatic cooling method from polyethylene naphthalate having a resistivity as measured in the molten state in a certain range and if the surface roughness of the film and the thickness of the film satisfy a certain relational formula, and based on the finding the present invention has been attained.

SUMMARY OF THE INVENTION

In a first aspect of the present invention, there is provided a biaxially oriented polyethylene naphthalate film produced by the electrostatic cooling method from polyethylene naphthalate having a resistivity of $1 \times 10^7$ to $5 \times 10^8$ Ω.cm as measured in the molten state, said film having a center line average roughness Ra ($\mu$m) and a film thickness T ($\mu$m) which satisfy the following formula.

$$\frac{0.015}{T^{0.2}} \leq Ra \leq \frac{0.08}{T^{0.2}}$$

In a second aspect of the present invention, there is provided a magnetic tape comprising a biaxially oriented polyethylene naphthalate film produced by the electrostatic cooling method from polyethylene naphthalate having a resistivity of $1 \times 10^7$ to $5 \times 10^8$ Ω.cm as measured in the molten state, said film having a center line average roughness [Ra($\mu$m)] and a film thickness [T($\mu$m)] which satisfy the following formula:

$$\frac{0.015}{T^{0.2}} \leq Ra \leq \frac{0.08}{T^{0.2}}$$

and a magnetic layer coated on said film. The polyethylene naphthalate film has a high Young's modulus even in the case of thin one and is superior in flatness and handling qualities, and because of these specific properties, such a polyethylene naphthalate film is useful as the base film for magnetic recording medium.

DETAIL DESCRIPTION OF THE INVENTION

A "polyethylene naphthalate" used in the present invention represents a polymer constructed substantially of ethylene-2,6-naphthalate as the constitutional unit, and also ethylene-2,6-naphthalate polymers modified with a third component in a small amount, e.g. less than 10 mol %, preferably less than 5 mol %.

Polyethylene naphthalate is usually produced by polycondensing naphthalene-2,6-dicarboxylic acid or a functional derivative thereof such as dimethyl naphthalene-2,6-dicarboxylate with ethylene glycol under proper reaction conditions in the presence of a catalyst. As a third component, dicarboxylic acid such as adipic acid, sebacic acid, phthalic acid, isophthalic acid, terephthalic acid, and naphthalene-2,7-dicarboxylic acid, and a lower alkyl ester thereof; hydroxycarboxylic acid such as p-hydroxybenzoic acid, and a lower alkyl ester thereof; and dihydric alcohol such as propylene glycol, trimethylene glycol, tetramethylene glycol, pentamethylene glycol, and hexamethylene glycol may be exemplified.

As the polyethylene naphthalate used in the present invention, a polymer having an adequate polymerization degree indicated by an intrinsic viscosity of not less than 0.40, preferably from 0.45 to 0.90, and more preferably 0.55 to 0.85 is preferable, since the polyethylene naphthalate is poor in mechanical properties in the case where polymerization degree is too low. [The method of measurement of intrinsic viscosity: 1 g of polyethylene naphthalate tip or film is added to 100 ml of phenol/1,1,2,2-tetrachloroethane (50/50 by weight) solution and the mixture is heated at 140° C. for 30 min., thereby dissolving the polyethylene naphthalate tip or film, and thereafter, an intrinsic viscosity is measured at 30.0° C.]

According to the present invention, the polyethylene naphthalate defined as mentioned above is made into biaxially oriented film in the following manner.

At first, polyethylene naphthalate is extruded at 280° C. to 320° C. into a sheet by using an extruder. The extruded sheet is cooled below 80° C. so that it becomes substantially amorphous. The cooled sheet is stretched in the longitudinal and transverse directions at an area draw ratio of 4 at a temperature of 130° C.–160° C. Finally, the biaxially oriented film is heat-treated at 120° C. to 250° C.

The biaxially oriented polyethylene naphthalate film should be produced from polyethylene naphthalate having a resistivity of $1 \times 10^7$ to $5 \times 10^8$ $\Omega$.cm as measured in the molten state. The reason for this is explained in the following. The conventional polyethylene naphthalate film is not necessarily satisfactory in flatness and the uneven flatness makes the film inadequate for the base film of magnetic recording medium which needs high accuracy. The flatness of biaxially oriented film depends largely on the uniformity of amorphous film. This is conspicuous in the case of thin film of thinner than 30 μm. It is known that, in the case of polyethylene terephthalate film, the flatness can be improved by the use of electrostatic cooling method. According to this method, the molten polymer sheet is electrostatically charged so that the sheet is strongly attracted toward the rotating cooling drum by the electrostatic force. It is also known that this method is effective if the molten polyethylene terephthalate has a low resistivity. However, it is not yet confirmed whether or not the electrostatic cooling method is also effective for polyethylene naphthalate. Nothing has been reported about the preferred operating range.

As a result of the present inventors' investigation of the resistivity of polyethylene naphthalate in the molten state, it has been found that:

(1) the resistivity of polyethylene naphthalate in the molten state reaches a minimal value when a phosphorus compound is increasingly added relative to the amount of a metallic compound such as ester interchange catalyst dissolved in polyethylene naphthalate, (2) the minimal value is about $10^7$ $\Omega$.cm, though the value varies depending on the amount and kind of the metallic compound and phosphorus compound, and (3) the resistivity as measured in the molten state is not lower than $10^{10}$ $\Omega$.cm when a phosphorus compound is excessively added relative to the amount of metallic compound.

Upon comparing this data with that of polyethylene terephthalate, it has been found that the resistivity of polyethylene naphthalate in the molten stat is usually higher than that of polyethylene terephthalate, and that the resistivity of polyethylene naphthalate is an order of magnitude higher than that of polyethylene terephthalate if the same kind of ion in the same amount is contained therein.

As far as the present inventors know, there has been no instance in which the electrostatic cooling method was applied to the production of polyethylene naphthalate film. It would be very difficult to apply effectively the electrostatic cooling method to the production of polyethylene naphthalate film, because polyethylene naphthalate is at a disadvantage not only in having a high resistivity in the molten state but also in having a markedly high melt viscosity and high melt temperature as compared with polyethylene terephthalate. Further, because of the high melt viscosity and melt temperature, polyethylene naphthalate has to be processed under the molding conditions considerably different from those of polyethylene terephthalate.

It has been found by the present inventors that the electrostatic cooling method can be applied to the production of extremely thin, uniform polyethylene naphthalate film if polyethylene naphthalate as the raw material has a resistivity as measured in the molten state in the range from $1 \times 10^7$ to $5 \times 10^8$ $\Omega$.cm.

According to the present invention, the polyethylene naphthalate as the raw material for making film should have a resistivity as measured in the molten state in the range from $1 \times 10^7$ to $5 \times 10^8$ $\Omega$.cm, preferably $1 \times 10^7$ to $1 \times 10^8$ $\Omega$.cm If the resistivity is lower than $1 \times 10^7$ $\Omega$.cm, the polyethylene naphthalate can be made into film having good flatness, but it is poor in thermal stability. The poor thermal stability causes the decrease of molecular weight during the drying or melting process. This is responsible for the poor mechanical properties of the resulting film. On the other hand, if the resistivity is higher than $5 \times 10^8$ $\Omega$.cm, the polyethylene naphthalate is not effectively processed by the electrostatic cooling method and the resulting film is poor in flatness. This adverse effect is conspicuous when the rotating cooling drum is run at a high speed to increase the production rate.

The resistivity of polyethylene naphthalate can be adjusted in the following manner. To reduce the resistivity, polyethylene naphthalate should be incorporated with a soluble metal component. This is accomplished by adding a phosphorus compound in a small amount, e.g. less than equimolar amount, to the metallic element used as a catalyst for ester interchange reaction or the metallic element to be added as required after the ester interchange reaction or esterification reaction.

On the other hand, to increase the resistivity, the content of dissolved metallic elements in polyethylene naphthalate should be reduced. This is accomplished by reducing the amount of metallic compounds dissolved in polyethylene naphthalate, or by converting the metallic compounds mostly into metal salts such as carboxylates, phosphates, and phosphites which are insoluble in polyethylene naphthalate in the case where the metallic compounds are used in large amount. To put it concretely, the object is achieved by adding a phosphorus compound of more than equimolar amount with respect to the metallic element such as calcium and manganese used as an ester interchange catalyst.

In the case where two or more kinds of polyethylene naphthalate are used as the raw material for polyethylene naphthalate film, the resistivity as measured in the molten state of the mixture should be used.

According to the present invention, the polyethylene naphthalate film should have a certain degree of surface roughness. The reason for this is explained in the following. Up to now, the use of polyethylene naphthalate film as the base material of magnetic tape has been known, but very little has been studied on its handling qualities in contrast with a great interest in mechanical and thermal properties derived from its chemical structure. Handling qualities are important in practical use of the film. With this in mind, the present inventors have examined polyethylene naphthalate film for handling qualities, and as the result, it was found that the handling qualities are closely related with the center line average roughness [Ra($\mu$m)]. It was also found that the preferred range of Ra varies according to the thickness of polyethylene naphthalate film, namely, the film thickness [T($\mu$m)] becomes smaller and as a result the roughness value should be greater.

According to the present invention, it is necessary that the center line average roughness [Ra($\mu$m)] and the film thickness [T($\mu$m)] should satisfy the following formula.

$$\frac{0.015}{T^{0.2}} \leq Ra \leq \frac{0.08}{T^{0.2}}$$

Preferably, it is necessary that Ra ($\mu$m) and T ($\mu$m) should satisfy the following formula.

$$\frac{0.02}{T^{0.2}} \leq Ra \leq \frac{0.05}{T^{0.2}}$$

If the value of Ra ($\mu$m) is smaller than $$\frac{0.015}{T^{0.2}},$$

the resulting film will suffer from severe film-to-film blocking and excessive friction with film guides etc. On the other hand, if the value of Ra ($\mu$m) is greater than $$\frac{0.08}{T^{0.2}},$$

the improvement in handling qualities reaches a plateau and the film used as the base of magnetic tape aggravates the performance of magnetic tape such as electromagnetic conversion on account of the excessively rough surface. In addition, the thickness of the polyethylene naphthalate film in the present invention is 4 to 40 $\mu$m, preferably 4 to 20 $\mu$m, and more preferably 4 to 12 $\mu$m.

As mentioned above, it is necessary in the present invention that the polyethylene naphthalate film should have a center line average roughness in a specific range which is limited by the relation with film thickness. The surface roughness defined above can be obtained by incorporating polyethylene naphthalate with a finely divided inert compound. This is accomplished by the so-called particle separation method, or preferably by the so-called particle addition method.

According to the particle separation method, a phosphorus compound is added to the reaction system for polyethylene naphthalate. The phosphorus compound reacts with metallic compounds dissolved in the reaction system after esterification or ester interchange reaction, thereby separating out fine particles. This method is simple and easy to accept for industrial use, but it is difficult to reconcile the adequate resistivity of the polymer and the adequate surface roughness of the film, because the separated particles change the resistivity of the polymer in the molten state, which in turn adversely affects the surface roughness required of the film. In addition, the amount of particles to separate out is limited.

On the other hand, according to the particle addition method, inert fine particles are added to polyethylene naphthalate at any stage of process from polyester production to film extrusion. As examples of the inert fine particles, metallic compounds such as kaolin, talc, magnesium carbonate, calcium carbonate, barium carbonate, calcium sulfate, barium sulfate, lithium phosphate, calcium phosphate, magnesium phosphate, aluminum oxide, silicon oxide, and titanium oxide, and carbon black may be exemplified. The form of these inert compounds may be spherical, massive, or flaky. They are not specifically limited in hardness, specific gravity, and color. The inert compound should have an average particle diameter of 0.1 to 10 $\mu$m, preferably 0.3 to 3 $\mu$m (in equivalent diameter of equal volume sphere). The inert compound should be added to the film in an amount of 0.01 to 1 wt %, preferably 0.05 to 0.8 wt %, and more preferably 0.1 to 0.5 wt %.

According to the present invention, the polyethylene naphthalate film having good film flatness and handling qualities is obtained as mentioned above. The film is more useful as the base of magnetic recording medium if the film has a degree of crystallinity in a specific range. That is, a degree of crystallinity of the polyethylene naphthalate film in the present invention is from 28 to 50 %, preferably 30 to 45 %, and more preferably 33 to 40 %.

In the production of magnetic recording medium, the base film is exposed to high temperatures because the magnetic layer is applied and then the thus applied base film is dried by heating, or because a ferromagnetic metal is deposited for high-density recording on account of an increasing demand for high-density recording. For producing magnetic recording media, the polyethylene naphthalate film should have a degree of crystallinity not less than 28 %, preferably not less than 30 %, so that the film resists shrinkage caused by heat and keeps its high Young's modulus. The high degree of crystallinity also contributes to the good slittability of the film.

On the other hand, if a degree of crystallinity of the film is excess of 50 %, the production of white powder which is formed when the film surface is rubbed against an object, is observed. This powder aggravates the electromagnetic conversion performance and causes the dropout of recorded signals. Therefore, such film is inadequate as the base of magnetic recording medium.

In addition, the degree of crystallinity in the present invention is the weight-based degree of crystallinity calculated from the density on the assumption that the crystalline phase has a density of 1.407 and the amorphous phase has a density of 1.325.

The magnetic tape as a magnetic recording medium is produced by forming a magnetic layer on the surface of the base film of the biaxially oriented polyethylene naphthalate film according to the present invention by a coating method or a vacuum evaporation method.

The polyethylene naphthalate film of the present invention is superior in mechanical and thermal properties to polyethylene terephthalate film. According to the present invention, the biaxially oriented polyethylene naphthalate film is produced by the electrostatic cooling method from polyethylene naphthalate having the resistivity as measured in the molten state in a specific range, so that the center line average roughness [Ra($\mu$m)] and the film thickness [T($\mu$m)] satisfy a relational formula:

$$\frac{0.015}{T^{0.2}} \leq Ra \leq \frac{0.08}{T^{0.2}}.$$

Therefore, the polyethylene naphthalate film according to the present invention is also superior in some other properties which have never been recognized, that is, it is improved in film flatness and handling qualities which become conspicuous in the case of thin film. The biaxially oriented polyethylene naphthalate film according to the present invention is a very good base film having not more than 0.2 of thickness irregularity for magnetic recording medium, which is of great industrial value. The film is most useful, since the film meets the practical and sophisticated requirements, if it has a degree of crystallinity in a specific range.

The invention will be explained in more detail with reference to the following examples, which are not intended to restrict the scope of the invention. In the examples, the physical properties were measured according to the following methods.

Center line average roughness [Ra($\mu$m)]: Measured in the following manner with a surface roughness tester (SE-3FK) made by Kosaka Kenkyusho Co., Ltd. Ra is a value (in $\mu$m) given by the formula below, assuming that a profile-curve part equivalent to the reference length L (2.5 cm) is sampled in the direction of the center line from the profile curve of a sample film and the roughness curve is expressed as a function Y=f(X), with the X-axis representing the center line of the sampled profile-curve part and the Y-axis representing the longitudinal direction (longitudinal magnification direction).

$$Ra = \frac{1}{L} \int_0^L |f(X)| dX$$

Measurements are carried out with a stylus having a tip radius of 2 $\mu$m under a load of 30 mg at a cut-off value of 80 $\mu$m. Ra is expressed as an average value of ten measurements, five each in the longitudinal direction and transvers direction.

Resistivity in the molten state: Measured according to the method described in Brit. J. Appl. Phys., vol. 17, pp. 1149–1154 (1966). The polymer sample is melted at 295° C. and the measurement is carried out immediately after the application of a DC voltage (1000 V).

Film flatness: Obtained by averaging 100 measured values of film thickness, that is, at 10 points every 10 cm in the transverse direction at each of 10 points every 1000 m in the longitudinal direction.

Film thickness: Measured with a micrometer made by Anritsu Denshi Co., Ltd. Ten pieces of film are taken from the vicinity of the point where the thickness is to be measured, and they are put one on top of the other. The measured value for the 10-piled films is converted into the thickness of a single film. The thickness irregularity of film is defined by $$\frac{X\text{max} - X\text{min}}{\overline{X}},$$

wherein Xmax is the maximum value of measured values, Xmin is the minimum value of measured values, and $\overline{X}$ is the arithmetic mean value of measured values. The thickness irregularity should preferably be as small as possible.

Handling qualities: Rated in the following three ranks according to the ease of winding operation in the film making step and the subsequent film handling steps.
- A: Film can be wound smoothly and passed through the subsequent steps without troubles.
- B: Film can be wound and passed through the subsequent steps, but less smoothly than in the case of A.
- C: Film wrinkles in the winding step and the resulting roll has the rugged edges. Film does not pass through the subsequent steps smoothly and stops the line frequently. .
- Running Property: The cassette tape is run for one minute by using the conventional cassette tape recorder and then the cassette tape is fast forwarded until a length of one second of the cassette tape. The other half of the cassette tape is run and the observation whether the running thereof is stopped is carried out. In the results of 10 times testing, "A" represents no running-stop being occurred, "B" represents a running-stop being occurred and "C" represents not less than two running-stops being occurred.

EXAMPLE I

Preparation of polyethylene naphthalate

Dimethyl naphthalene-2,6-dicarboxylate (100 parts) and ethylene glycol (60 parts) were subjected to ester interchange reaction in the presence of calcium acetate monohydrate (0.1 part). The reaction was started at 180° C. and the reaction temperature was raised gradually as methanol was distilled away. After four hours, the reaction temperature reached 230° C. and the ester interchange reaction was substantially completed.

The polycondensation reaction was carried out in the usual way after the addition of triethyl phosphate (0.07 parts), calcium carbonate having an average particle diameter of 0.9 $\mu$m (0.4 parts), and antimony trioxide (0.04 parts). As the temperature was slowly raised, the pressure was gradually reduced from normal pressure. After two hours, the temperature reached 290° C. and the pressure decreased to 0.3 mmHg. After five hours from the start of reaction, polyethylene naphthalate was discharged by the aid of pressurized nitrogen.

The polyethylene naphthalate thus obtained had an intrinsic viscosity of 0.64 and a resistivity of $8.2 \times 10^7 \Omega \cdot cm$ as measured in the molten state. Observation under a microscope indicates that calcium carbonate particles are extremely evenly dispersed in the polymer.

Preparation of polyethylene naphthalate film

The polyethylene naphthalate was extruded at 295° C. into an amorphous sheet by using the electrostatic cooling method. The electrostatic charging was performed by applying a DC voltage of about 9 kV to the positive electrode, which is a tungsten wire of 0.1 mm in diameter, stretched over the rotating drum in the direction perpendicular to the flow of the sheet. The rotating drum was run at a linear speed of 35 m/min. The resulting amorphous film was stretched 3.5 times in the longitudinal direction and 3.6 times in the transverse direction, followed by heat treatment at 200° C. for 40 seconds. Thus there was obtained a 10 μm thick biaxially oriented film having a degree of crystallinity of 40 %. The thickness variation of the film was as satisfactorily small as 0.12.

The resulting film had a center line average roughness of 0.021 μm, and the film felt smooth and had good handling qualities.

Table 1 shows the characteristic properties of the biaxially oriented polyethylene naphthalate film, which prove the usefulness of the film as a base material for magnetic recording medium.

EXAMPLES 2 to 4 and COMPARATIVE EXAMPLES 1 to 3

Polyethylene naphthalates were produced in the same manner as in Example 1 except that the triethyl phosphate and inorganic compound were changed which were added after the completion of ester interchange reaction. The resulting polyethylene naphthalate was made into a biaxially oriented film in the same manner as in Example 1. The condition for making the film were adjusted so that the film has the thickness and degree of crystallinity as shown in Table 1. The performance of the film was evaluated and the results are shown in Table 1.

Samples of polyethylene naphthalate in Examples 2 to 4 had an adequate resistivity as measured in the molten state and the biaxially oriented films produced therefrom had an adequate center line average roughness and an adequate film thickness which satisfy the above-mentioned relationship. The biaxially oriented films obtained in Examples 2 to 4 were so good in handling qualities as to be used in varied applications. In addition, they have an adequate degree of crystallinity and are useful as the base film, especially as the thin base film, for magnetic recording medium.

In contrast, the polymer in Comparative Exmaple 1 had an adequate resistivity as measured in the molten state, but the film produced therefrom had an excessively small value of center line average height because the polymer was not incorporated with inert fine particles that impart an adequate degree of surface roughness to the film. Therefore, the film suffered from severe film-to-film blocking and had excessive friction with film guides. It was of no practical use.

The film obtained in Comparative Example 2 had a surface roughness specified in the present invention but had an excessive film thickness variation because the polymer as the raw material had an excessively high resistivity as measured in the molten state. Therefore, the film was not suitable for the base material of magnetic recording medium.

The film obtained in Comparative Example 3 was poor in handling qualities because of insufficient surface roughness. In addition, the film was poor in shrinkage at heating, modulus, and slittability because of its low degree of crystallinity (26 %).

TABLE 1

| Examples and Comparative Examples | Polyethylene-2,6-naphthalate | | | Polyethylene-2,6-naphthalate film | | | | | | |
|---|---|---|---|---|---|---|---|---|---|---|
| | Triethyl phosphate (parts) | Surface roughening agent | | Resistivity as measured in the molten state, (Ω · cm) | Film thickness T(μm) | $\frac{0.015}{T^{0.2}}$ | $\frac{0.018}{T^{0.2}}$ | Ra (μm) | Handling qualities | Thickness irregularity | Degree of crystallinity |
| Example 1 | 0.07 | Mean particle diameter Calcium carbonate | 0.9 μm 0.4 parts | $8.2 \times 10^7$ | 10 | 0.0095 | 0.050 | 0.021 | A | 0.12 | 40 |
| Example 2 | 0.08 | Mean particle diameter Silicon dioxide | 1.3 μm 0.3 parts | $1.0 \times 10^8$ | 10 | 0.0095 | 0.050 | 0.025 | A | 0.13 | 37 |
| Example 3 | 0.09 | Mean particle diameter Titanium dioxide | 0.3 μm 0.4 parts | $2.1 \times 10^8$ | 5 | 0.011 | 0.058 | 0.017 | A | 0.14 | 34 |
| Example 4 | 0.10 | Mean particle diameter Calcium carbonate | 0.8 μm 0.3 parts | $4.2 \times 10^8$ | 20 | 0.0083 | 0.044 | 0.018 | A | 0.15 | 34 |
| Comparative Example 1 | 0.08 | — | | $8.2 \times 10^7$ | 10 | 0.0095 | 0.050 | 0.003 | C | 0.12 | 40 |
| Comparative Example 2 | 0.30 | Mean particle diameter Kaolin | 1.1 μm 0.3 parts | $6.0 \times 10^{10}$ | 10 | 0.0095 | 0.050 | 0.027 | A | 0.38 | 42 |
| Comparative Example 3 | 0.09 | Mean particle diameter | 0.7 μm | $8.9 \times 10^7$ | 10 | 0.0095 | 0.050 | 0.007 | B | 0.13 | 26 |

TABLE 1-continued

| Examples and Comparative Examples | Polyethylene-2,6-naphthalate | | | | Polyethylene-2,6-naphthalate film | | | | | | |
|---|---|---|---|---|---|---|---|---|---|---|---|
| | Tri-ethyl phosphate (parts) | Surface roughening agent | | Resistivity as measured in the molten state, (Ω · cm) | Film thickness T(μm) | $\frac{0.015}{T^{0.2}}$ | $\frac{0.018}{T^{0.2}}$ | Ra (μm) | Handling qualities | Thickness irregularity | Degree of crystallinity |
| | | Kaolin | 0.03 parts | | | | | | | | |

EXAMPLE 5

Magnetic tapes were produced by the following method using polyethylene naphthalate films obtained in Examples 1–4 and Comparative Examples 1–3.

The mixture composed of the following composition was kneaded for 24 hours.

| | (parts by weight) |
|---|---|
| Ferromagnetic material composed of γ-Fe₂O₃ | 250 |
| Polyurethane | 40 |
| Nitrocellulose | 15 |
| Vinyl chloride-vinyl acetate copolymer | 25 |
| Lecithin | 10 |
| Methyl ethyl ketone | 250 |
| Butyl acetate | 250 |

15 parts by weight of polyisocyanate compound was added to the thus kneaded mixture and the thus obtained mixture was subject to dispersing treatment for one hour, thereby obtaining a magnetic painting material. The thus obtained magnetic painting material was coated on the surface of the polyethylene naphthalene films produced in Examples 1–4 and Comparative Examples 1–3, respectively so that the thickness of the dried magnetic painting material is 6 μm. Before drying the magnetic painting material, the magnetic material was subjected to magnetic orientation treatment by the ordinary method. After drying and curing in oven, the thus treated magnetic tape precursor was subjected to calender treatment and then was slitted, thereby obtaining a magnetic tape of ½-inch in width.

In the process of manufacturing the magnetic tape, the results of evaluation with respect to a coating irregularity and a running property of the magnetic tape are shown in Table 2.

TABLE 2

| Base film | Coating irregularity | Running property |
|---|---|---|
| Example 1 | Good | A |
| Example 2 | Good | A |
| Example 3 | Good | A |
| Example 4 | Good | A |
| Comparative Example 1 | Good | C |
| Comparative Example 2 | Bad | A |
| Comparative Example 3 | Good | B–C |

What is claimed is:

1. A biaxially orierted polyethylene naphthalate film having a center line average roughness Ra μm and a film thickness T μm defined by the following relationship:

$$\frac{0.015}{T^{0.2}} \leq Ra \leq \frac{0.08}{T^{0.2}},$$

prepared by electrostatically cooling a polyethylene naphthalate sheet prepared from a polyethylene naphthalate melt having a resistivity of $1 \times 10^7$ to $5 \times 10^8$ Ω.cm as measured in the molten state.

2. The biaxially oriented polyethylene naphthalate film of claim 1, which forms the base material for a magnetic recording medium.

3. The biaxially oriented polyethylene naphthalate film of claim 1, wherein the thickness of the film ranges from 4–40 μm.

4. The biaxially oriented polyethylene naphthalate film of claim 3, wherein said film thickness ranges from 4–20 μm.

5. The biaxially oriented polyethylene naphthalate film of claim 4, wherein said film thickness ranges from 4–12 μm.

6. The biaxially oriented polyethylene naphthalate film of claim 1, wherein said polyethylene naphthalate melt has an intrinsic viscosity of not less than 0.40.

7. The biaxially oriented polyethylene naphthalate film of claim 6, wherein said intrinsic viscosity ranges from 0.45–0.9.

8. The biaxially oriented polyethylene naphthalate film of claim 7, wherein said intrinsic viscosity ranges from 0.55–0.85.

9. The biaxially oriented polyethylene naphthalate film of claim 1, wherein said film has a degree of crystallinity ranging from 28–50%.

10. The biaxially oriented polyethylene naphthalate film of claim 1, wherein said film is electrostatically cooled to a temperature below 80° C. so that said film becomes substantially amorphous in structure.

11. The biaxially oriented polyethylene naphthalate film of claim 1, wherein said polyethylene naphthalate melt has a resistivity ranging from $1 \times 10^7$ to $1 \times 10^8$ Ω.cm.

12. The biaxially oriented polyethylene naphthalate film of claim 1, wherein said polyethylene naphthalate is prepared by polycondensing naphthalene-2,6-dicarboxylic acid or derivative thereof with ethylene glycol with less than 10 mol % of a third component selected from the group consisting of adipic acid, sebacic acid, phthalic acid, isophthalic acid, terephthalic acid, naphthylene-2,7-dicarboxylic acid, lower alkyl esters thereof, p-hydroxybenzoic acid, lower alkyl esters thereof, propylene glycol, trimethylene glycol, tetramethylene glycol, pentamethylene glycol and hexamethylene glycol.

13. A biaxially oriented polyethylene naphthalate film having a center line average roughness Ra μm and a film thickness T μm defined by the relationship:

$$\frac{0.015}{T^{0.2}} \leq Ra \leq \frac{0.08}{T^{0.2}}$$

prepared by:
- extruding polyethylene naphthalate containing a phosphorus compound which controls the resistivity of the molten polyethylene naphthalate to within the range of $1 \times 10^7$ to $5 \times 10^8$ Ω.cm, as measured in the molten state, and which contains from 0.01–1 wt. % of inert fine particles, at a temperature ranging from 280° C.–320° C. into a film;
- electrostatically cooling said polyethylene naphthalate film such that the degree of crystallinity of the film ranges from 28–50%;
- stretching the film obtained in two directions; and
- heat-treating the biaxially oriented film obtained at 120° C.–250° C.

14. A magnetic tape, comprising:
- a biaxially oriented polyethylene naphthalate film having a center line average roughness [Ra(μm)] and a film thickness [T(μm)] defined by the following relationship:

$$\frac{0.015}{T^{0.2}} \leq Ra \leq \frac{0.08}{T^{0.2}}$$

which is prepared by electrostatically cooling a polyethylene naphthalate sheet prepared from a polyethylene naphthalate melt having a resistivity of $1 \times 10^7$ to $5 \times 10^8$ Ω.cm, as measured in the molten state, and
- a magnetic layer coated on said film.

* * * * *